(12) United States Patent
Nöske et al.

(10) Patent No.: US 8,573,420 B2
(45) Date of Patent: Nov. 5, 2013

(54) CRAWLER CRANE AND METHOD FOR FINE-TUNING A BASIC OPERATING POSITION OF SUCH A CRAWLER CRANE

(75) Inventors: Ingo Nöske, Zweibrücken (DE); Alfons Weckbecker, Zweibrücken (DE); Werner Rutz, Queidersbach (DE)

(73) Assignee: Terex Cranes Germany GmbH, Zweibruecken (DE)

( * ) Notice: Subject to any disclaimer, the term of this patent is extended or adjusted under 35 U.S.C. 154(b) by 475 days.

(21) Appl. No.: 12/922,262

(22) PCT Filed: Mar. 10, 2009

(86) PCT No.: PCT/EP2009/001701
§ 371 (c)(1),
(2), (4) Date: Sep. 13, 2010

(87) PCT Pub. No.: WO2009/112236
PCT Pub. Date: Sep. 17, 2009

(65) Prior Publication Data
US 2011/0017694 A1 Jan. 27, 2011

(30) Foreign Application Priority Data
Mar. 13, 2008 (DE) .......................... 10 2008 014 139

(51) Int. Cl.
*B66C 23/78* (2006.01)

(52) U.S. Cl.
USPC .............................. 212/302; 180/41; 180/9.52

(58) Field of Classification Search
USPC ......... 212/276–277, 301–303, 223, 255, 271; 414/695; 180/9.52, 9.5, 41
See application file for complete search history.

(56) References Cited

U.S. PATENT DOCUMENTS 3,430,790 A * 3/1969 Beltrami ........................ 414/695
4,386,711 A * 6/1983 Gattu et al. .................... 212/303
(Continued)

FOREIGN PATENT DOCUMENTS

| DE | 1634725 A1 | 12/1971 |
| DE | 3534626 A1 | 3/1987 |
| DE | 3706931 A1 | 9/1988 |
| DE | 9406572 U1 | 10/1994 |

(Continued)

*Primary Examiner* — Emmanuel M Marcelo
*Assistant Examiner* — Angela Caligiuri
(74) *Attorney, Agent, or Firm* — Browdy and Neimark, PLLC

(57) ABSTRACT

The invention relates to a crawler crane comprising two crawler supports (9) with rotating crawlers (8). Both crawler supports (9) are connected by a transversal bridge (10). A superstructure (3) of the crawler crane comprises at least one crane jib that can pivot about a vertical axis and is connected to the transversal bridge (10). A pivotable articulation connects the transversal bridge (19) in a pivotable manner to the crane superstructure (3). At least one of the crawler supports (9) is connected to the transversal bridge (10) by means of a double link (11). A lower link (12) of the double link (11) is articulated on the crawler support (9) by means of a crawler support lower pivotable axis (13) and on the transversal bridge (10) by means of a transversal bridge lower pivotable axis (14). An upper link (15) of the double link (11) is articulated on the crawler support (9) by means of a crawler support upper pivotable axis (16) and on the transversal bridge (10) by means of a transversal bridge upper pivotable axis (17). A drive (20), in particular motorised drive, is used to pivot at least one of the two links (12, 15) about the pivotable axis (13) associated therewith, the result being a level-controllable crawler crane, in which the expenditure for adjusting a basework position is reduced.

9 Claims, 8 Drawing Sheets

(56) References Cited

U.S. PATENT DOCUMENTS

| | | | |
|---|---|---|---|
| 6,394,204 B1 * | 5/2002 | Haringer | 180/9.52 |
| 6,601,718 B2 * | 8/2003 | Sawodny et al. | 212/270 |
| 6,994,067 B2 * | 2/2006 | Wallis | 123/190.8 |
| 7,325,634 B2 * | 2/2008 | Law et al. | 180/9.52 |

FOREIGN PATENT DOCUMENTS

| | | |
|---|---|---|
| DE | 202006002023 U1 | 6/2007 |
| JP | 57101674 U | 6/1982 |
| JP | 64001077 U1 | 1/1989 |
| JP | 2002087337 A | 3/2002 |

\* cited by examiner ically does not deviate from the horizontal. This requires a time-consuming and expensive preparation of a basic operating position of the known crawler crane through grading operations.

It is an aim of the present invention to improve a crawler crane of the type mentioned at the beginning in such a way that the amount of time and expense required for fine-tuning a basic operating position of the crawler crane is reduced.

This aim is achieved according to the invention by a crawler crane having the features specified in claim 1.

In accordance with the invention it has been recognized that an undercarriage of the crawler crane with the two crawler supports in many cases can be set up in such a way that it has virtually no pitch inclination about a horizontal axis transverse to the driving direction, but only a roll inclination about an axis longitudinal to the driving direction. This roll inclination can be compensated via the double link according to the invention. The adjustment drive can be designed to be motor-driven, hydraulic or magnetic. It is also possible in principle to not equip the adjustment drive with an adjustment motor of its own, but to drive the adjustment movement, for example, derived from another motor of the crawler crane or also from an external motor. In principle, a single such double link suffices, the other connections of the crawler supports to the at least one transversal bridge then being capable of being repositioned passively. It is preferred, however, when a plurality of such double links are used. It is also possible, for example, to provide per crawler support a plurality of such double links arranged one after another in the driving direction. The adjustment drive can be designed compact with high power density and robustness.

An arrangement as claimed in claim 2 increases the stability of the crawler crane.

A plurality of drive-adjustable double links as claimed in claim 3 improve the fine-tuning precision of a level control of the crawler crane.

A lower-link adjustment drive as claimed in claim 4 lowers the center of gravity of the crawler crane. A pivot shaft that is driven via the adjustment drive is then, in particular, the crawler-support lower pivot shaft.

A gear unit as claimed in claim 5 facilitates the connection and, if applicable, also the design of the adjustment motor.

A gear unit as claimed in claim 6 can increase a distance between a motor shaft of the adjustment motor and a component of the double link driven by same, thereby simplifying the design of the double link.

An adjustment drive as claimed in claim 7 is robust. The nut can be designed self-locking. This self-locking behavior can be combined with a sensitive adjustability, thereby permitting a precise inclination fine-tuning or leveling capability to be achieved. Through the design of the adjustment drive with the threaded rod and the nut, it is possible to derive from the rotational adjustment drive a translational, low-backlash movement for an inclination fine-tuning, the movement monitoring of which is possible in a simple manner.

A trapezoidal thread design as claimed in claim 8 results in a self-locking of the adjustment drive. Additionally, such a trapezoidal thread has a high load-bearing capacity.

A driven threaded rod as claimed in claim 9 makes possible an adjustment drive, the design of which can be implemented with little time and expenditure.

A control device as claimed in claim 10 permits the adjustment drive to be activated in particular from a cab of the crawler crane.

An inclination sensor as claimed in claim 11 makes possible a precise inclination measurement. The inclination sensor can be a contactless magnetoresistive measuring element having a measuring range of +/−10%.

A regulating module as claimed in claim 12 makes possible an automatically regulated adjustment of the adjustment drive for level control of the upper structure of the crawler crane.

A linear guiding mechanism as claimed in claim 13 makes possible a guided transmission of force between the nut and the driven link, while simultaneously creating the possibility of a high force transmission between the nut and the driven link. The linear guiding mechanism can be implemented by means of a plurality of bearing rollers. A bearing support for the linear guiding mechanism can be provided on both sides of the nut. The linear guiding mechanism can support the nut in both directions of movement longitudinal to the threaded rod.

The advantages of a method as claimed in claims 14 and 15 correspond to those that have already been discussed above with reference to the crawler crane according to the invention. The adjustment of the adjustment drive can be effected automatically regulated. This can be achieved, for example, by using the measured value from an inclination sensor, such that the crane structure of the crawler crane maintains its basic operating position within a predefined permissible variation.

An illustrative embodiment of the invention will be explained in more detail below in conjunction with the drawing, in which.

Figure 1:
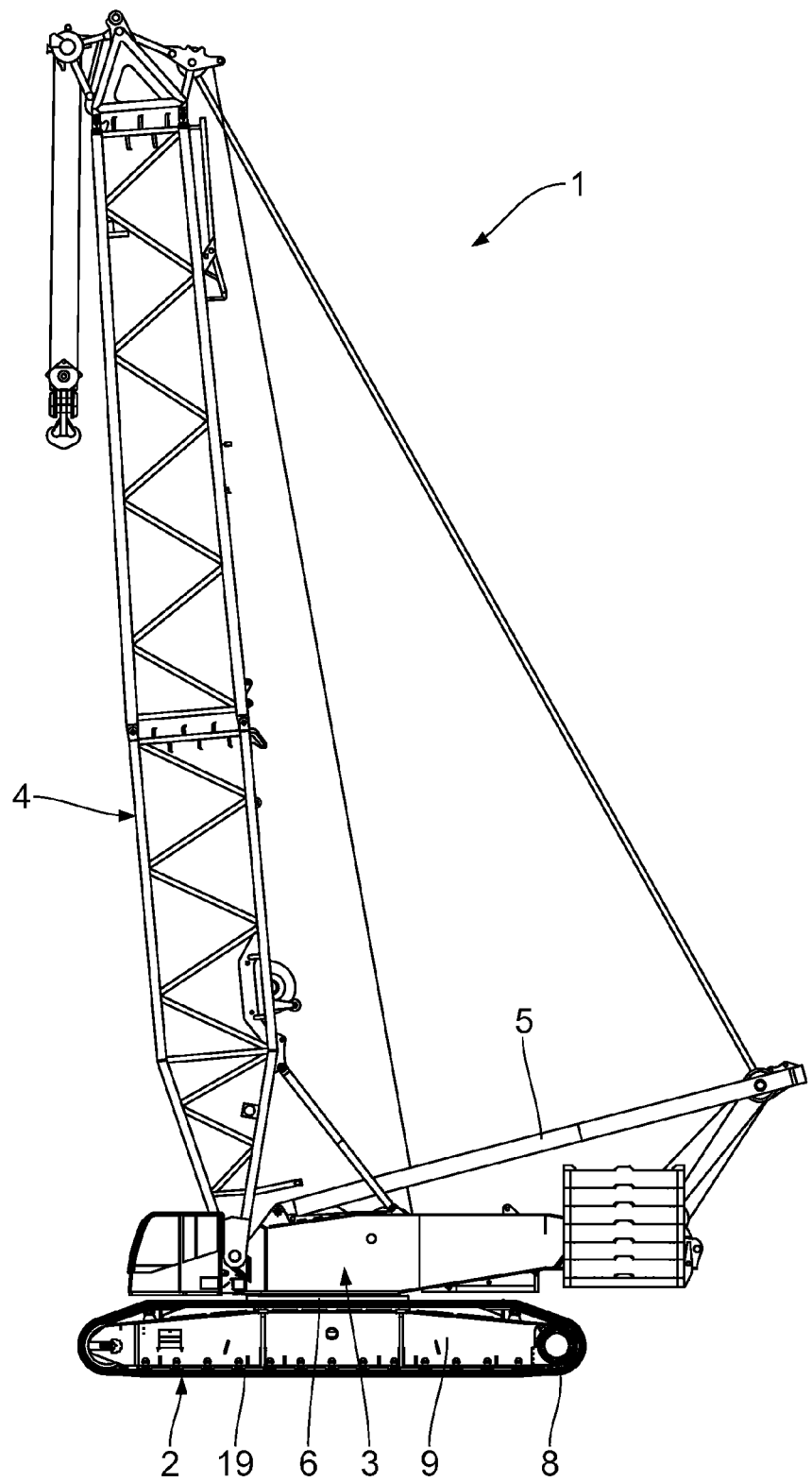
FIG. 1 shows a side view of a crawler crane.

A crawler crane has a mobile undercarriage 2, an upper structure 3, a main crane boom 4 and a counter-boom 5. The upper structure 3 can rotate relative to the undercarriage 2 about a vertical axis 7 by means of a roller slewing ring device 6, which is only intimated in FIGS. 1 and 2.

The undercarriage has two driven crawlers 8 that are supported and guided by means of two crawler supports 9 that are arranged parallel to one another. The two crawler supports 9 are connected to one another by means of a transversal bridge 10 or by means of a plurality of such transversal bridges. The at least one transversal bridge 10, in turn, carries the roller slewing ring device 6. The roller slewing ring device 6 is a pivot articulation that connects the at least one transversal bridge 10 in a pivot-mounted fashion to the upper structure 3, that is to say to the crane structure.

Figure 3:
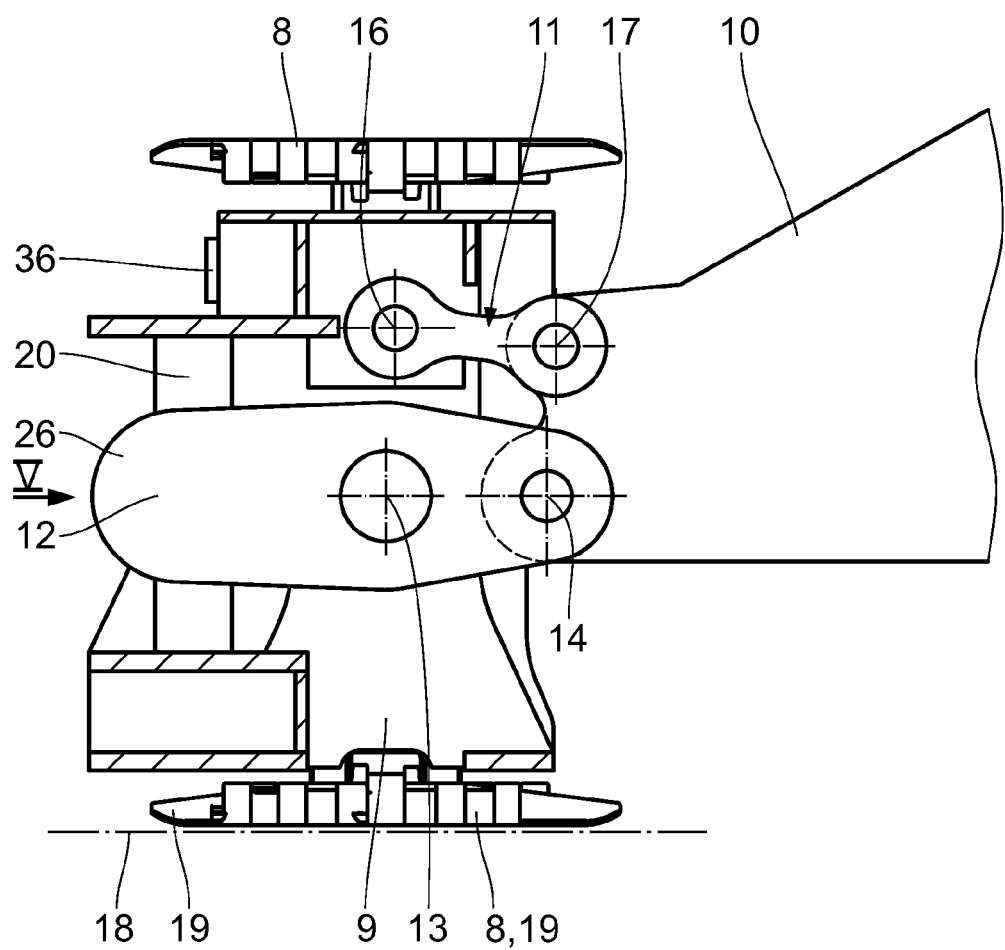
FIG. 3 shows a vertical section through a crawler support of the crawler crane in the area of a double linkage thereof to a transversal bridge of the undercarriage represented by a broken line, a crawler of the crawler support being shown positioned on a horizontally extending ground surface.
Figure 4:
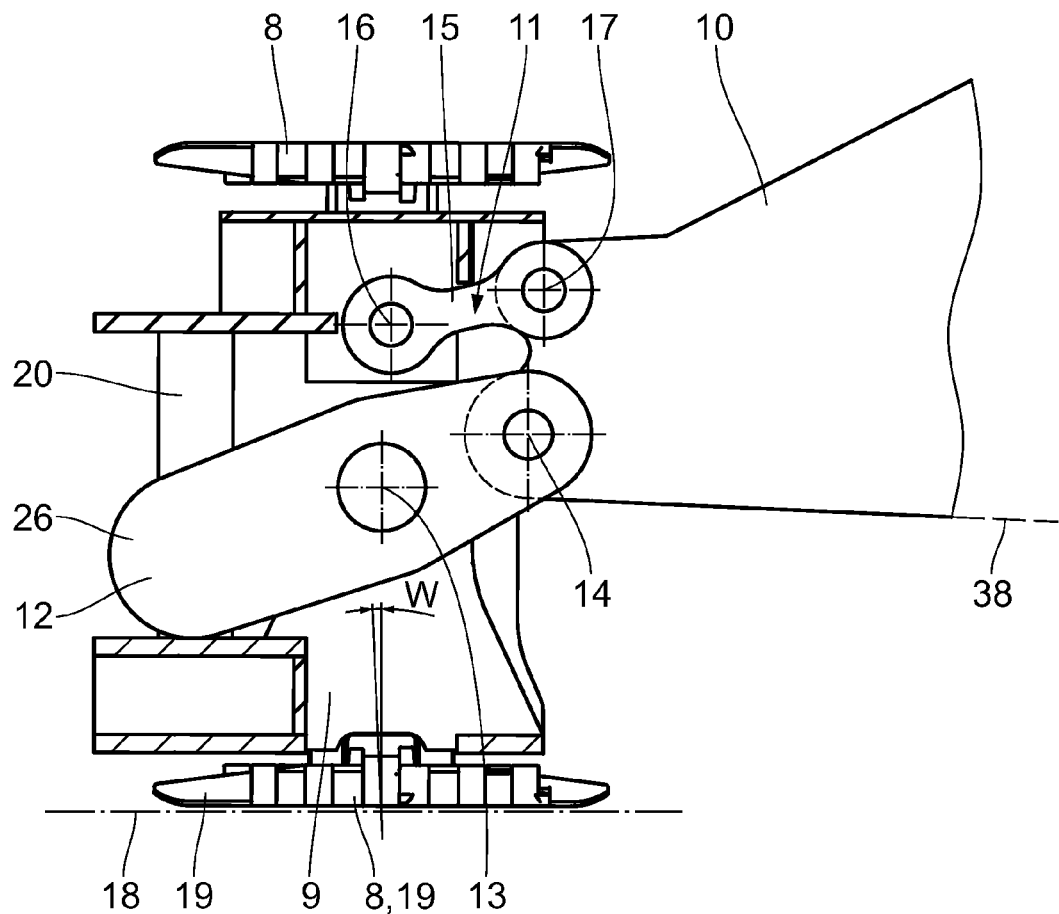
FIG. 4 shows the crawler support with the transversal bridge and the crawler in an illustration similar to FIG. 3, with the crawler shown positioned on an inclined ground surface, such that a roll angle of the undercarriage results that is different from zero.
Figure 5:
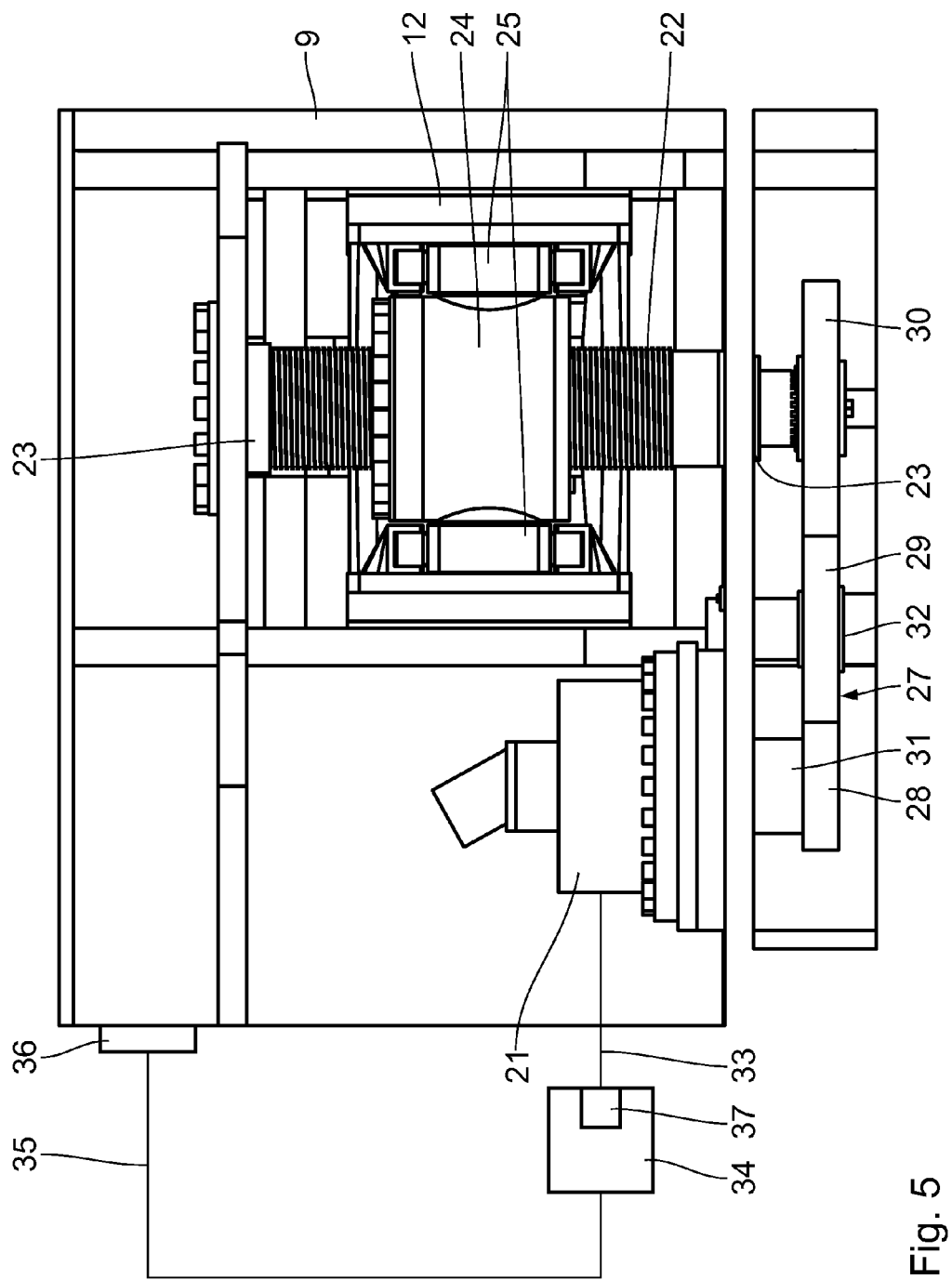
FIG. 5 shows a detail view of a section of the crawler support from the direction V in FIG. 3.

The at least one transversal bridge 10 is connected at the two ends thereof to the respective crawler support 9 via a double link 11, which is illustrated in detail in FIGS. 3 to 5. The double link 11 has a lower link 12 that is articulated on the crawler support 9 via a crawler-support lower pivot shaft 13 and on the transversal bridge 10 via a transversal-bridge lower pivot shaft 14. Additionally, the double link 11 has an upper link 15 that is articulated on the crawler support 9 via a crawler-support upper pivot shaft 16 and on the transversal bridge 10 via a transversal-bridge upper pivot shaft 17.

Both the lower link 12 and the upper link 15 have two identically contoured link plates that are arranged spaced apart one behind the other in the drawing plane of FIGS. 3 and 4 and fixedly connected to one another via shaft elements. The upper link 15 is reminiscent in the shape thereof of a chain link of a bicycle chain.

If a plurality of cross members 10 are present in the crawler crane 1, each cross-member end is connected to the facing crawler support 9 by means of such a double link 11.

Figure 2:
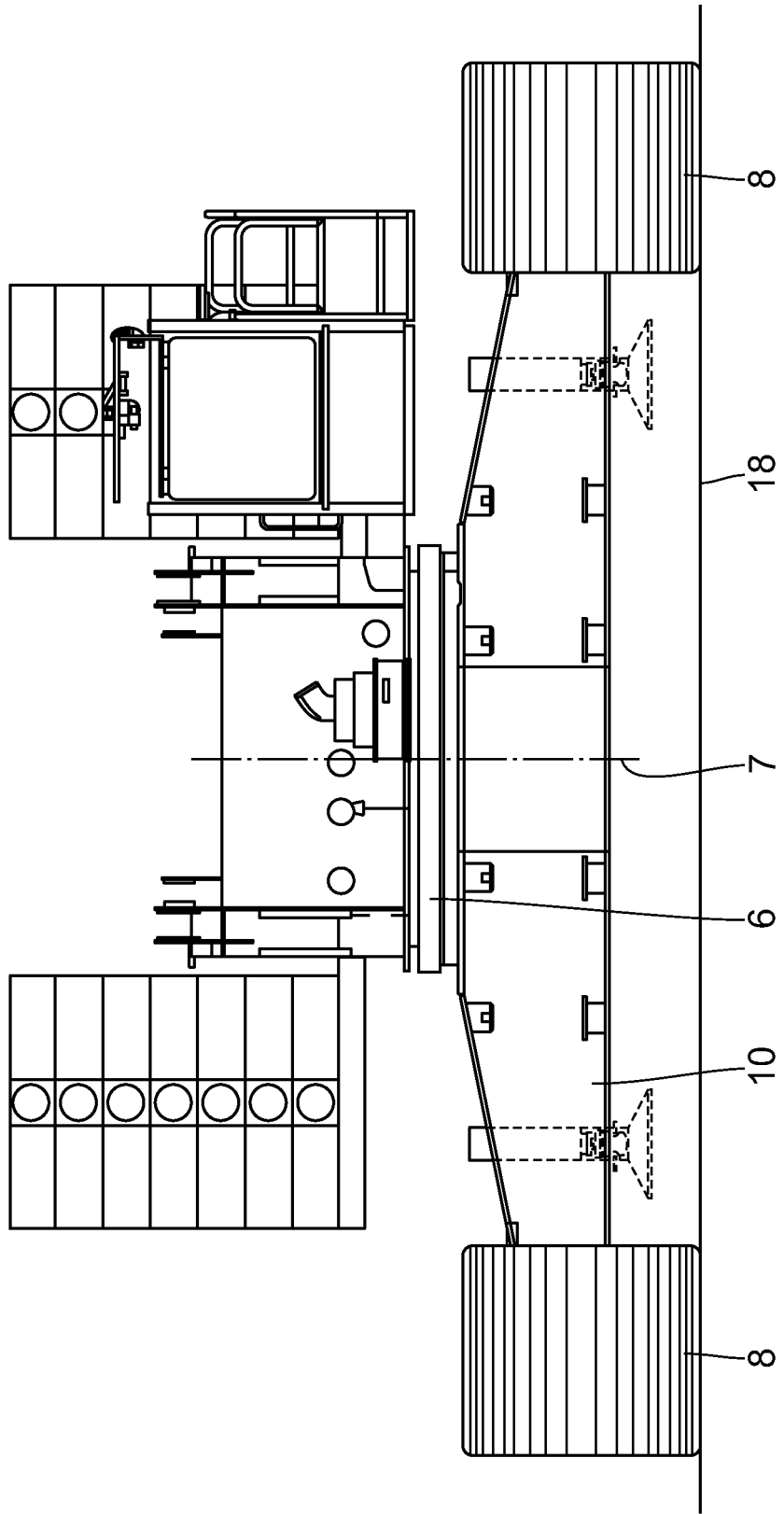
FIG. 2 shows a front view of an undercarriage of the crawler crane according to FIG. 1 together with components of a crane structure of the crawler crane, certain boom elements of the crawler crane having been left out.

The pivot shafts 13, 14, 16, 17 all extend parallel to one another and parallel to a foot print plane 18 that is defined by a bottom tread 19 of the crawler 8 resting on the ground. In FIGS. 2 and 3 the foot print plane 18 extends horizontally. The crawler crane 1 and in particular also the crawler supports 9 then neither have a roll inclination nor a pitch inclination. In this non-inclined position of FIGS. 2 and 3, the two lower pivot shafts 13 and 14 of the double link 11 are on approximately the same level. The transversal-bridge upper pivot shaft 17 is slightly lower in this position than the crawler-support upper pivot shaft 16. In this position the crawler-support upper pivot shaft 16 lies vertically above the crawler-support lower pivot shaft 13, and the transversal-bridge upper pivot shaft 17 lies vertically above the transversal-bridge lower pivot shaft 14. The mutual distance between the two lower pivot shafts 13, 14 is virtually equal to the mutual distance between the two upper pivot shafts 16, 17. The mutual distance between the two crawler-support pivot shafts 13, 16 also is approximately equal to the mutual distance between the transversal-bridge pivot shafts 14, 17 and corresponds to the distance between the lower pivot shafts 13, 14 and the upper pivot shafts 16, 17. Altogether, the four pivot shafts 13, 14, 16, 17 in the position according to FIGS. 2 and 3 therefore lie approximately in the corners of a square.

An adjustment drive 20 having an adjustment motor 21 serves for pivotally displacing the lower link 12 about the crawler-support lower pivot shaft 13 and thereby for a level-controlling of the crawler crane 1 to be described further below. Each of the double links 11 of the crawler crane 1 can have such an adjustment drive 20.

The adjustment drive 20 has a threaded rod 22 that extends perpendicular to the foot print plane 18 and is connected to the crawler support 9 by means of an axial/radial bearing 23 fixedly connected to the crawler support, in a manner so as to be able to rotate about the longitudinal axis of the threaded rod 22. The threaded rod 22 has an external thread that is designed in the form of a trapezoidal external thread. A nut 24 that is connected to the lower link 12 in a manner so as to be unable to rotate relative to the crawler support 9, by means of connecting pieces 25 that define a parallel key guidance runs on the threaded rod 22. The nut 24 has a trapezoidal internal thread that is complementary to the external thread of the threaded rod 22.

The nut 24 is connected to a lever end 26 of the lower link 12, the lever end being located opposite the transversal-bridge lower pivot shaft 14. The crawler-support lower pivot shaft 13 lies between the lever end 26 and the transversal-bridge lower pivot shaft 14.

The adjustment motor 21 drives a rotation of the threaded rod 22 about the longitudinal axis thereof by means of a gear unit 27 that is designed in the form of a reduction gear. The gear unit 27 has three gear wheels 28, 29, 30 that are in combing engagement with one another. The first gear wheel 28 is connected to a drive shaft 31 of the adjustment motor 21 so as to be integral in rotation with the drive shaft. The second gear wheel 29 serving as an intermediate gear is connected by means of an axial/radial bearing 32 to the crawler support 9. The third gear wheel 30 is connected to the threaded rod 22 so as to be integral in rotation therewith. The number of teeth of the second gear wheel 29 is greater than the number of teeth of the first gear wheel 28. The number of teeth of the third gear wheel 30 is greater than the number of teeth of the second gear wheel 29.

The adjustment motor 21 is in signal connection with a control device 34 of the crawler crane 1 via a signal line 33. Connected to the control device 34 via an additional signal line 35 is an inclination sensor 36 which, in turn, is mounted fixedly to the crawler support 9 and reads a roll inclination of the crawler support 9, that is to say an inclination of same about an axis extending longitudinal to the driving direction. The control device 34 can have a regulating module 37 which likewise is in signal connection with the inclination sensor 36. The regulating module 37 is designed as an internal component of the control device 34. Alternatively, the regulating module 37 can also be an external component that is in signal contact with the control device 34.

FIG. 4 shows a level-controlled position of the transversal bridge 10 at a foot print plane 18 of the crawler support 9 that is inclined relative to a horizontal. A roll angle W between the foot print plane 18 and the horizontal is 4°. In this inclined position of the crawler support 9 a level control of the transversal bridge 10 is ensured by means of the double link 11 such that a transversal-bridge plane 38 and therefore also the upper structure 3 has no roll inclination (W=0°) relative to the horizontal.

In the position according to FIG. 4 the pivot shafts 13, 14, 16, 17 assume approximately the positions of the corners of a rhombus. The double link 11 thus has performed a parallelogram pivot movement from the position according to FIG. 3 to the position according to FIG. 4.

In order to fine-tune a basic operating position of the crawler crane 1 the undercarriage 2 is first moved into a raw operating position. This raw operating position is selected such that the crawler crane 1 has no pitch inclination, that is to say no inclination of the foot print plane 18 relative to the horizontal about an axis extending transversely to the driving direction. Then, only the roll inclination needs to be compensated via the level control. The roll angle W of the respective crawler support 9 relative to the vertical is then measured with the aid of the inclination sensor 36. This roll inclination is communicated via the signal line 35 to the control device 34. The regulating module 37 calculates, for example via a calibration table, from the determined roll inclination a positioning value for the adjustment motor 21. This positioning value is supplied to the adjustment motor 21 via the signal line 33.

A rotational displacement of the threaded rod 22 by the adjustment drive 20 is effected accordingly in such a way that the nut 24 assumes on the threaded rod 22 an axial position that corresponds to a predefined angle of pivot of the lower link 12 about the crawler-support lower pivot shaft 13. According to this pivot angle the double link 11 moves into a level-controlled position in which the transversal bridge plane 38 extends substantially horizontal despite the roll inclination of the crawler support 9 by the roll angle W. This ensures a minimal angle of the vertical axis 7 of the upper structure 3 relative to the vertical, such that the main crane boom 4 can support the nominal load thereof in a weight-balanced manner.

The adjustment of the adjustment drive 20 for the level control of the upper structure 3 can take place automatically regulated via the regulating module 37. Alternatively, it is possible for the inclination sensor 36 to, for example, read a roll angle and for the operator of the crawler crane 1 to carry out an appropriate fine-tuning of the double link 11 based on this roll angle via the control device 34.

Further details of the adjustment drive 20 for pivotally displacing the lower link 12 will be explained below in conjunction with FIGS. 6 to 8.

Figure 6:
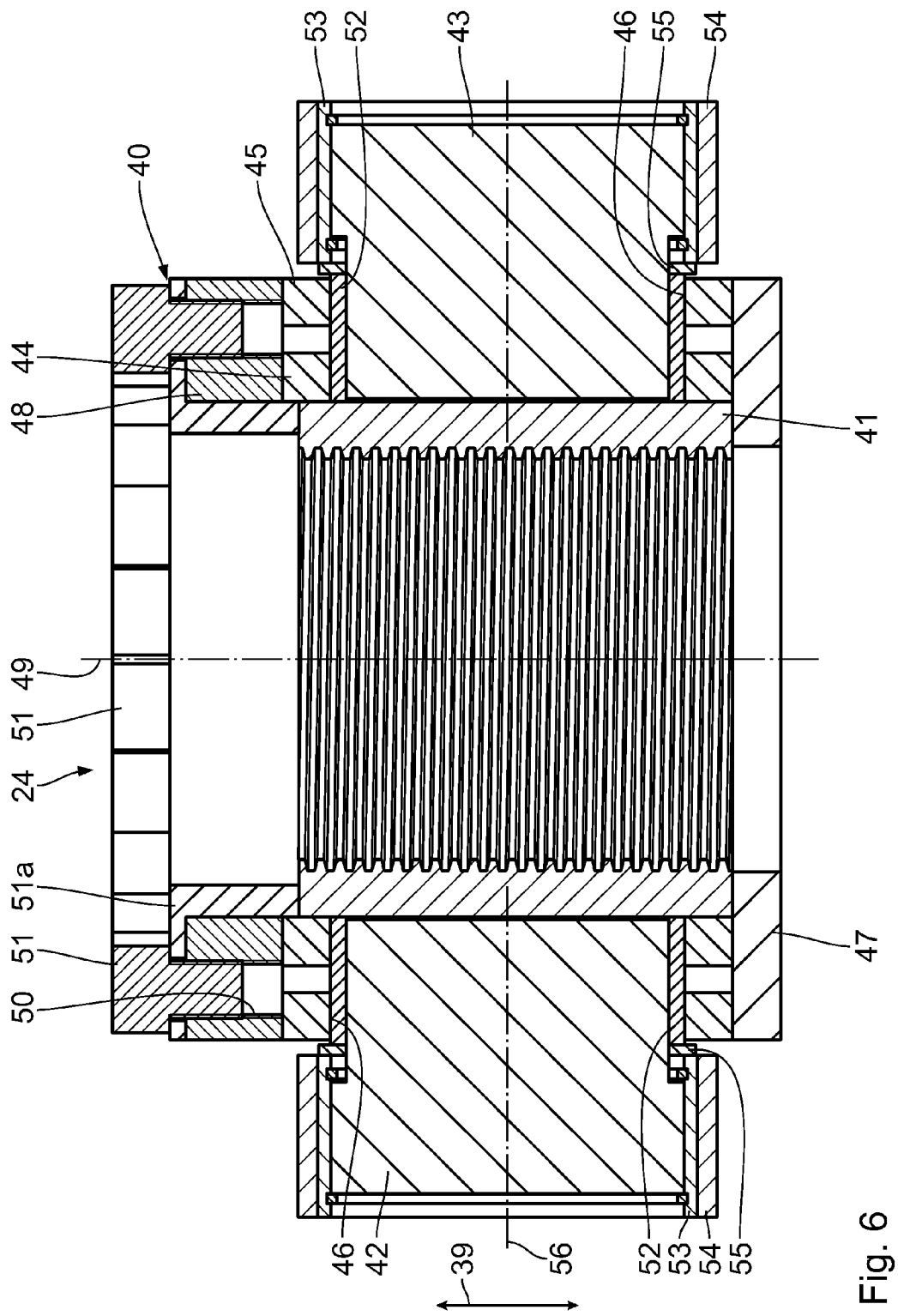
FIG. 6 shows, in even greater detail than FIG. 5, a nut as a component of an adjustment drive for pivotally displacing a lower link of the undercarriage and thereby for a level-controlling of the crawler crane.
Figure 7:
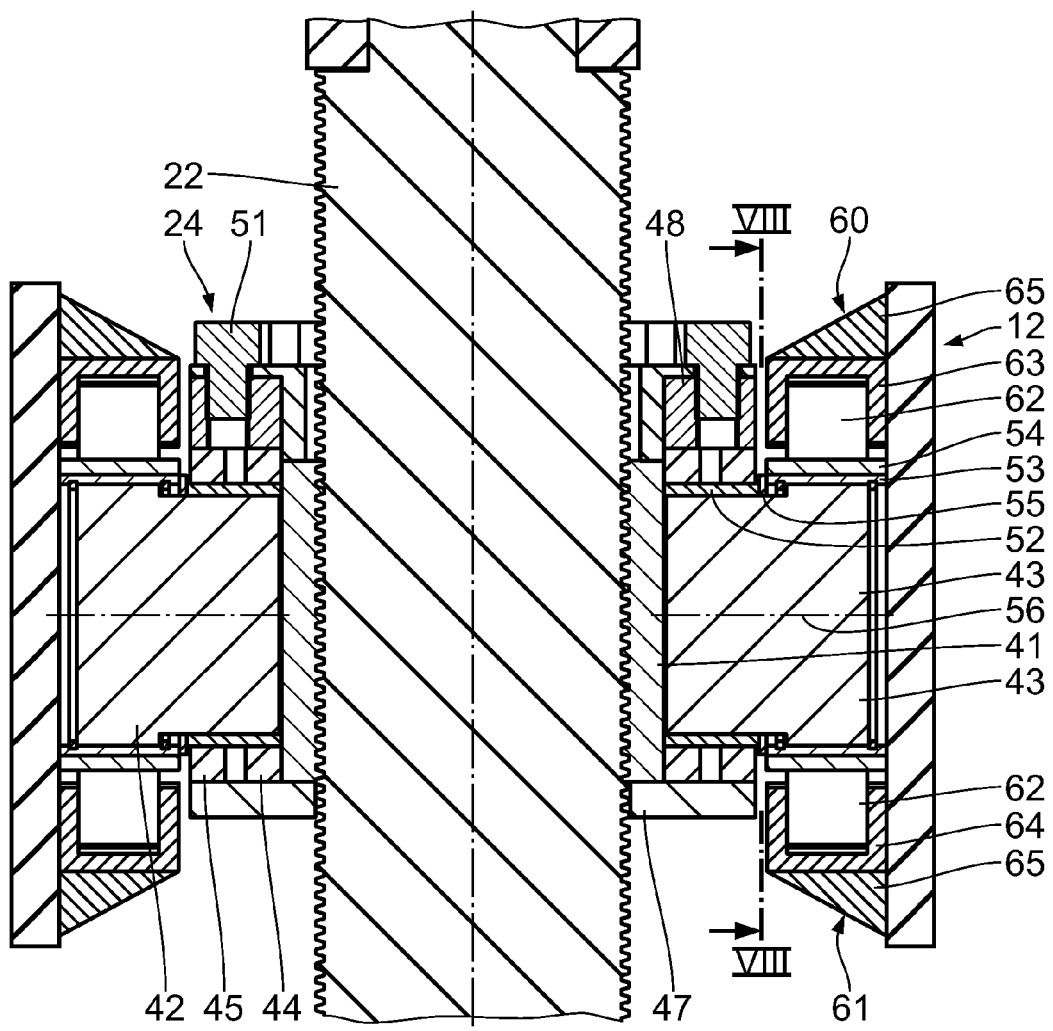
FIG. 7 shows an axial section through the adjustment drive in the area of the connection of the nut according to FIG. 6 to a rotationally driven threaded rod of the adjustment drive.

FIG. 6 shows the nut 24 in detail. The nut transforms the rotary motion of the driven threaded rod 22 into a linear movement longitudinal to the threaded rod 22 (cf. double arrow 39). This linear movement 39 is then transmitted to the lower link 12 by means of a guiding mechanism to be described further below.

The nut 24 comprises a thread carrier 40, a thread insert 41 and a pair of bolts 42, 43.

The thread carrier 40 has an inner boiler plate 44 and an outer boiler plate 45 that surround the thread insert on the outside. The boiler plates 44, 45 each have bores 46 for accommodating the bolts 42, 43. The boiler plates 44, 45 are held together both by a bottom sheet-metal ring 47 and a top sheet-metal ring 48. The bottom sheet metal ring 47 has an outer circumference that corresponds to the outer circumference of the outer boiler plate 45. The bottom sheet-metal ring 47 therefore is flush on the outside with the outer boiler plate 45. An inside diameter of the bottom sheet-metal ring 47 is slightly larger than the internal thread diameter of the thread insert 41, such that the thread insert 41 rests on the bottom sheet-metal ring 47. Toward the inside, the inner boiler plate 44 has guiding ribs, which are not shown in the drawing. Complementary to these guiding ribs, an outer wall of the thread insert 41 has guide grooves extending in an axial direction, that is to say in the direction of the axis 49 of FIG. 6. This complementary connection represents an anti-rotation locking mechanism of the thread insert 41 relative to the thread carrier 40 about the axis of rotation 49.

The top sheet-metal ring 48 has an outside diameter that corresponds to the outside diameter of the outer boiler plate 45. The top sheet-metal ring 48 therefore is flush toward the outside with the outer boiler plate 45. The top sheet-metal ring 48 has internal threads 50 that extend in an axial direction, that is to say parallel to the threaded rod 22 in the assembled state of the sheet metal ring 48, into which internal threads self-locking bolts 51 are screwed. A collar piece of a locking plate 51a is fixed between heads of the self-locking bolts 51 and the top sheet-metal ring 48. The locking plate 51a locks in place the axial position of the thread insert 41 relative to the thread carrier 40.

The thread carrier 40 accommodates the thread insert 41 and locks same in place. Additionally, it transmits the force from the thread insert 41 to the bolts 42, 43.

The thread insert 41 is made of bronze.

The bolts 42, 43 have a cross-sectional step that subdivides each bolt 42, 43 into an inner bolt section, which is arranged adjacent to the thread insert 41, and an outer bolt section. The inner bolt section has a smaller outside diameter than the outer bolt section of the bolts 42, 43. The bolts 42, 43 are inserted with the inner bolts sections thereof into the bores 46 of the boiler plates 44, 45. A sleeve 52 is arranged in each case between these bores 46 and the inner bolt section. Surrounding and resting against the outer bolt sections of the bolts 42, 43 in each case is first a sleeve 53 and surrounding the sleeve 53 in each case is a guiding body 54.

The sleeves 53 are pressed into the guiding bodies 53 surrounding same and secured on the respective bolts 42, 43. Serving this purpose in each case are locking rings. A wearing disk 55 is inserted between the thread carrier 40, that is to say the outer boiler plate 45, and the outer end wall of the sleeve 52 on one hand and an inner end section of the sleeve 53 on the other hand. On rotational displacement of the guiding body 54 relative to the thread carrier 40 about a bolt axis 56 extending horizontally in FIG. 6 a defined wear and tear is effected there owing to the wearing disk 55.

In the movement that is driven by the adjustment drive 20 the lower link 12 is pivoted about the crawler-support lower pivot shaft 13. The lever end 26 of the lower link 12 thus performs a circular arc-shaped motion of travel. The nut 24 connected to the lever end 26, in turn, performs a linear movement longitudinal to the threaded rod 22. The lever end 26 accordingly cannot be connected fixedly to the nut 24. The transmission of force between the nut 24 and the lever end 26 is effected by means of a guiding mechanism 57, details of which are shown in FIGS. 7 and 8. The guiding mechanism 57 is a linear guiding mechanism and is designed in the form of a roller-type connection. A top end wall 58 and a bottom end wall 59 of the guiding body 54 each run on a roller unit 60, 61 of the guiding mechanism 57. Each of the roller units 60, 61 has a plurality of bearing rollers 62, six in each case in the presented embodiment. The bearing rollers 62 of the top roller unit 60 are supported in a top bearing cage 63 and the bearing rollers 62 of the bottom roller unit 61 are supported in a bottom bearing cage 64. The bearing cages 63, 64 are fixedly connected to the lever end 26 of the lower link 12 via holding components 65 that are wedge-shaped in the section of FIG. 7.

Figure 8:
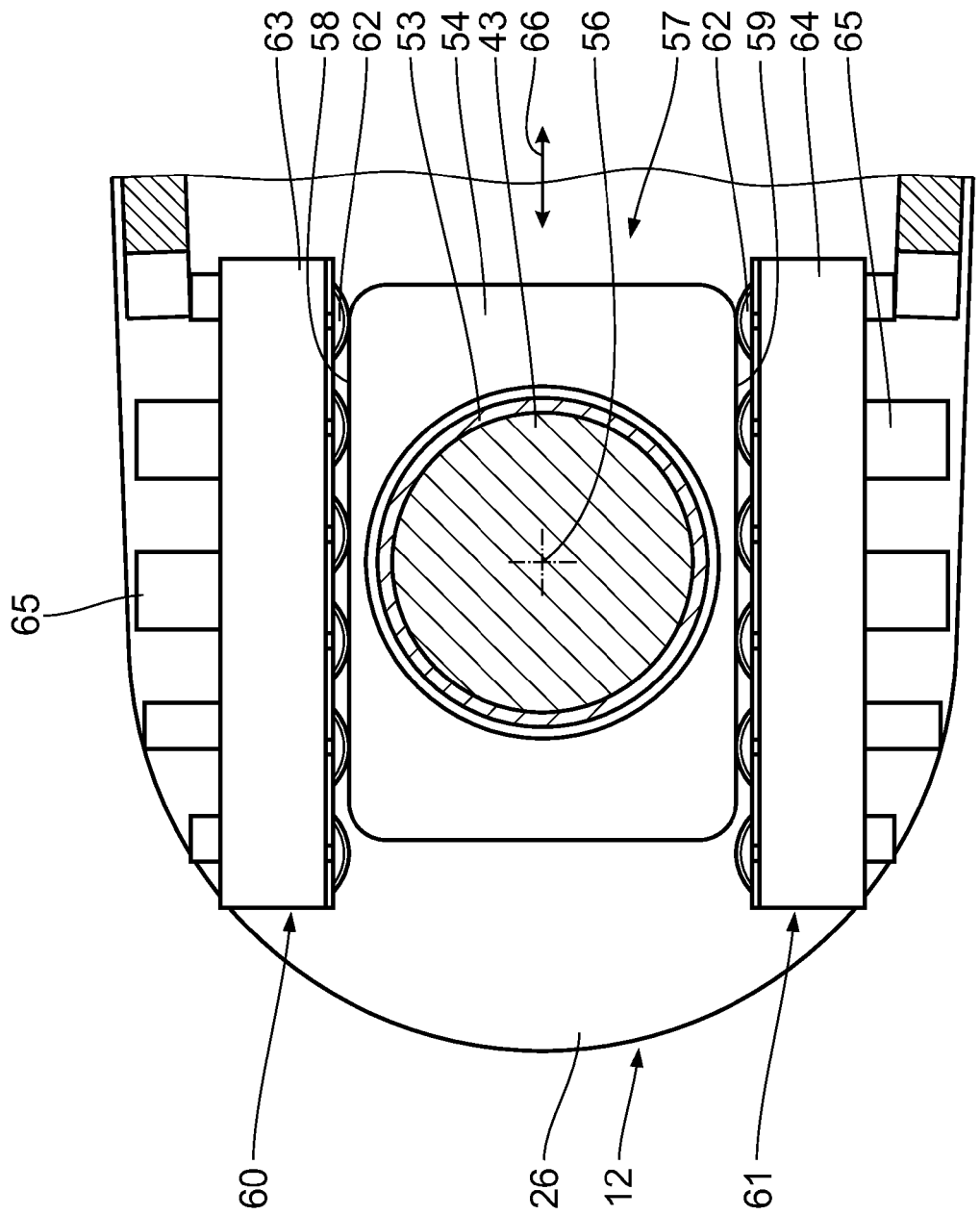
FIG. 8 shows a section along line VIII-VIII in FIG. 7.

When the lever end 26 is shifted longitudinally to the threaded rod 22 for pivotally displacing the lower link 12, this goes hand in hand, in particular near the top and bottom end of the total pivot range, with a linear relative movement of the guiding body 54 relative to the bearing cages 63, 64 longitudinal to a direction of movement marked in FIG. 8 with a double arrow 66. The guiding mechanism 57 ensures that this relative movement takes place in a guided manner, at the same time enabling a very high force to be transmitted between the guiding body 54 and the roller units 60, 61, and via same and the holding component 65 to the lever end 67. At the same time the guiding body 54 is rotationally displaced about the central bolt axis 56 during this movement.

What is claimed is:

1. A crawler crane (1) comprising:
   two crawler supports (9) having rotating crawlers (8),
   at least one transversal bridge (10) connecting the two crawler supports (9), wherein the at least one transversal bridge (10) comprises a transversal-bridge plane (38),
   a crane structure (3) having at least one crane boom (4, 5) connected to the transversal bridge (10) so as to be able to pivot about a vertical axis (7),
   a pivot articulation (6) that pivotally connects the transversal bridge (10) to the crane structure (3), wherein at least one of the crawler supports (9) is connected to the transversal bridge (10) via a double link (11) comprising:

a lower link (12) that is articulated on the crawler support (9) via a crawler support lower pivot shaft (13) and on the transversal bridge (10) via a transversal bridge lower pivot shaft (14), an upper link (15) that is articulated on the crawler support (9) via a crawler support upper pivot shaft (16) and on the transversal bridge (10) via a transversal bridge upper pivot shaft (17), and an adjustment drive (20) for pivotally displacing at least one of the two links (12, 15) about at least one of the pivot shafts with which said link is articulated to the crawler support (9) and the transversal bridge (10), wherein said double link (11) enables compensation of a roll inclination about an axis longitudinal to a driving direction defined by the two crawler supports (9), such that the roll inclination is provided between a foot print plane (18) of the crawler support (9) and the transversal-bridge plane (38), wherein the crane structure (3) has no roll inclination relative to the transversal-bridge plane (38), wherein the adjustment drive (20) has a reduction gear, wherein the adjustment drive (20) has a threaded rod (22) connected to the crawler support (9) and a nut (24) connected to the driven lower link (12), the nut being complementary to the thread of the threaded rod (22), wherein the threaded rod (22) has a trapezoidal external thread and the nut (24) has a trapezoidal internal thread complementary thereto, wherein the nut (24) is connected to the lower link (12) in a manner so as to be unable to rotate relative to the crawler support (9) by means of connecting pieces (25), wherein the connecting pieces (25) define a parallel key guidance for the nut (24).

2. A crawler crane (1) comprising:
two crawler supports (9) having rotating crawlers (8),
at least one transversal bridge (10) connecting the two crawler supports (9), wherein the at least one transversal bridge (10) comprises a transversal-bridge plane (38)
a crane structure (3) having at least one crane boom (4, 5) connected to the transversal bridge (10) so as to be able to pivot about a vertical axis (7),
a pivot articulation (6) that pivotally connects the transversal bridge (10) to the crane structure (3),
wherein at least one of the crawler supports (9) is connected to the transversal bridge (10) via a double link (11) comprising:

a lower link (12) that is articulated on the crawler support (9) via a crawler support lower pivot shaft (13) and on the transversal bridge (10) via a transversal bridge lower pivot shaft (14), an upper link (15) that is articulated on the crawler support (9) via a crawler support upper pivot shaft (16) and on the transversal bridge (10) via a transversal bridge upper pivot shaft (17), and an adjustment drive (20) for pivotally displacing at least one of the two links (12, 15) about at least one of the pivot shafts with which said link is articulated to the crawler support (9) and the transversal bridge (10), wherein said double link (11) enables compensation of a roll inclination about an axis longitudinal to a driving direction defined by the two crawler supports (9), such that the roll inclination is provided between a foot print plane (18) of the crawler support (9) and the transversal-bridge plane (38), wherein the crane structure (3) has no roll inclination relative to the transversal-bridge plane (38), wherein the adjustment drive (20) has a reduction gear, wherein the adjustment drive (20) has a threaded rod (22) connected to the crawler support (9) and a nut (24) connected to the driven lower link (12), the nut being complementary to the thread of the threaded rod (22), wherein the threaded rod (22) has a trapezoidal external thread and the nut (24) has a trapezoidal internal thread complementary thereto, wherein the nut (24) is connected to a lever end (26) of the lower link (12), the lever end being located opposite the transversal-bridge lower pivot shaft (14).

3. The crawler crane as claimed in claim 2, wherein the crawler-support lower pivot shaft (13) lies between the lever end (26) and the transversal-bridge lower pivot shaft (14).

4. A crawler crane (1) comprising:
two crawler supports (9) having rotating crawlers (8),
at least one transversal bridge (10) connecting the two crawler supports (9),
a crane structure (3) having at least one crane boom (4, 5) connected to the transversal bridge (10) so as to be able to pivot about a vertical axis (7),
a pivot articulation (6) that pivotally connects the transversal bridge (10) to the crane structure (3),
wherein at least one of the crawler supports (9) is connected to the transversal bridge (10) via a double link (11) comprising:

a lower link (12) that is articulated on the crawler support (9) via a crawler support lower pivot shaft (13) and on the transversal bridge (10) via a transversal bridge lower pivot shaft (14), an upper link (15) that is articulated on the crawler support (9) via a crawler support upper pivot shaft (16) and on the transversal bridge (10) via a transversal bridge upper pivot shaft (17), and an adjustment drive (20) for pivotally displacing at least one of the two links (12, 15) about at least one of the pivot shafts with which said link is articulated to the crawler support (9) and the transversal bridge (10), wherein said double link (11) enables compensation of a roll inclination about an axis longitudinal to a driving direction defined by the two crawler supports (9), wherein the adjustment drive (20) has a threaded rod (22) connected to the crawler support (9) and a nut (24) connected to the driven lower link (12), the nut being complementary to the thread of the threaded rod (22), and wherein the nut (24) is connected via a linear guiding mechanism (57) to the driven link (12).

5. The crawler crane as claimed in claim 4, wherein the linear guiding mechanism (57) is in the form of a roller-type connection.

6. The crawler crane as claimed in claim 4, wherein the guiding mechanism (57) comprises a guiding body (54) having a top end wall (58) and a bottom end wall (59), wherein the top end wall (58) runs on a top roller unit (60) and wherein the bottom end wall (59) runs on a bottom roller unit (61).

7. The crawler crane as claimed in claim 6, wherein each of the roller units (60, 61) has a plurality of bearing rollers (62).

8. The crawler crane as claimed in claim 7, wherein the bearing rollers (62) of the top roller unit (60) are supported in a top bearing cage (63) and the bearing rollers (62) of the bottom roller unit (61) are supported in a bottom bearing cage (64), wherein the bearing cages (63, 64) are fixedly connected to a lever end (26) of the lower link (12) via holding components (65).

9. The crawler crane as claimed in claim 8, wherein the holding components (65) are wedge-shaped in an axial section through the adjustment drive (20).

\* \* \* \* \*